Patented Sept. 7, 1926.

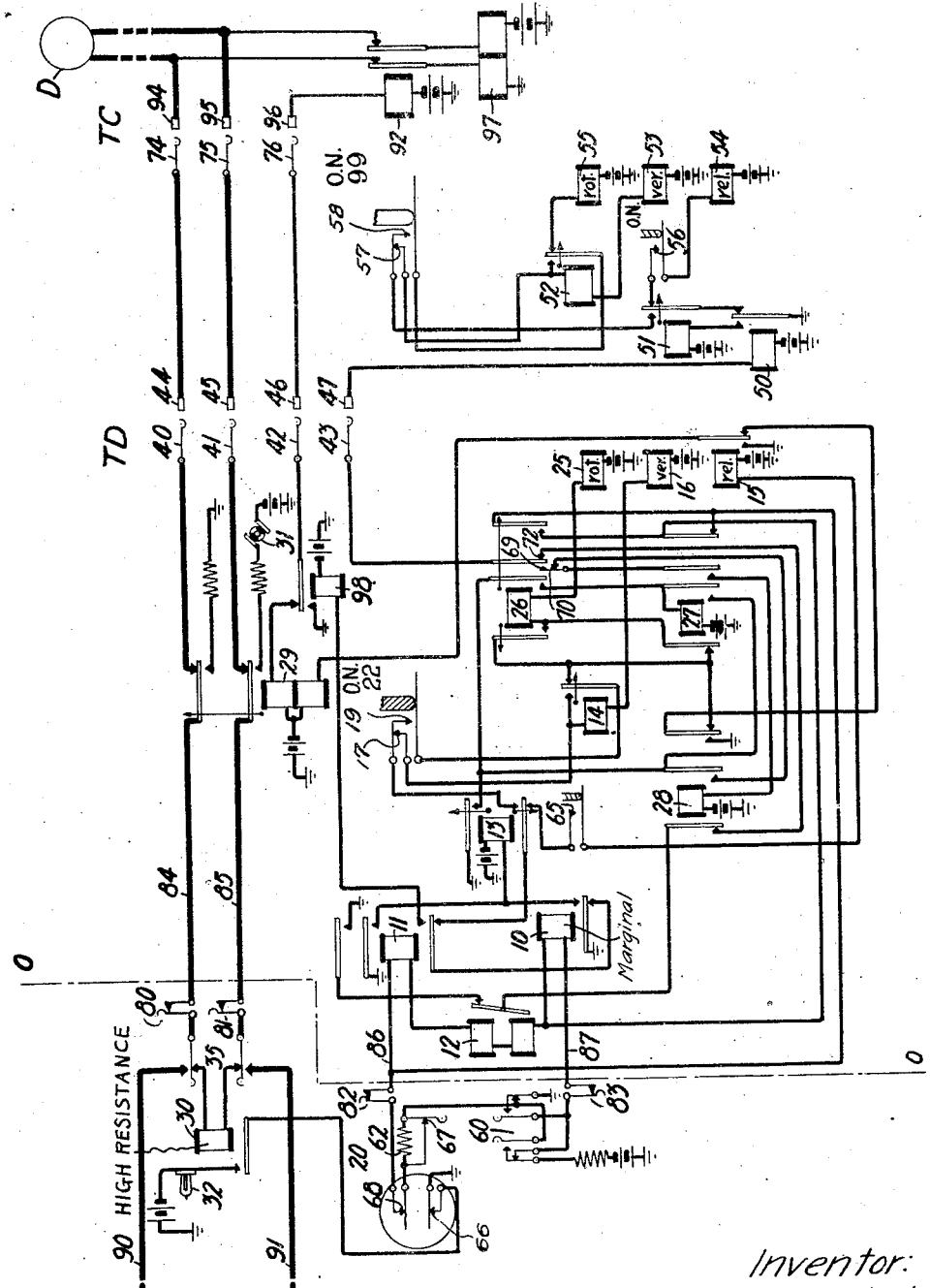

1,598,890

UNITED STATES PATENT OFFICE.

RAY L. STOKELY, OF FLORAL PARK, NEW YORK, ASSIGNOR TO WESTERN ELECTRIC COMPANY, INCORPORATED, OF NEW YORK, N. Y., A CORPORATION OF NEW YORK.

TESTING SYSTEM.

Application filed December 18, 1922. Serial No. 607,526.

This invention relates to testing systems and more particularly to circuit arrangements for use in extending connections from a testing operator's position to subscribers' lines terminating in a machine switching central office.

An object of the invention is to provide an improved arrangement for enabling a testing operator to establish connections, by means of machine switching apparatus, with subscribers' line terminating either in the same or in a distant machine switching central office.

To attain the object of the invention, a selector switch or a test distributor having only four movable terminals or brushes is employed for extending connections from the test desk to connector switches or test connectors having access to the subscribers' lines. The impulses for setting the connector switches are transmitted and the connector switch is held actuated after it is set over a common circuit which includes one of the movable terminals of the selector switch. The movable terminal, over which the impulses are transmitted and the connector is held, is also employed in testing the connector switch for a busy or idle condition. A relay at the selector switch operates if the selected connector switch is idle to disconnect the test devices of the selector switch from the connector and to connect the impulses and holding circuit thereto.

It is believed that the above and other features of the invention will be better understood from a detailed description of operation when considered in connection with the drawing which shows one embodiment of the invention.

Only such matter as is embodied in the present invention is shown in the drawing. The apparatus at the left of the dotted line O—O is located at the testing operator's position. The conductors 90 and 91 may extend to any desired testing circuit. "D" represents substation apparatus of the well known type of a line terminating in a machine switching central office. For extending the test circuit to the subscriber's station D, a test distributor TD and a test connector TC are shown to the right of the dotted line O—O. The apparatus at the right of the dotted line O—O may be in the same office as the testing circuits or in a distant central office. For connecting the apparatus at the testing operator's position to the automatic switches, a trunk circuit comprising the conductors 84 to 87, inclusive, is shown. For connecting the apparatus at the testing operator's position to the trunk circuit, manually controlled switches 80 to 83 inclusive are shown. These switches may be of any well known type of manual switch as, for example, a key or a plug and jack.

We will now assume that the testing operator has actuated the manual switches 80 to 83 inclusive, thereby connecting the key 35 and the dial 20 to the test distributor TD. Connection of the dial 20 to the test distributor causes the operation of relay 10 over a circuit extending from ground, through the right-hand normal contacts of key 60, contacts of key 67, contact 68 of dial 20, outer right-hand normal contact of relay 27, winding of relay 10 and left-hand normal contacts of key 60 to grounded battery. Relay 11 and polarized relay 12 do not operate at this time due to the shunt around their winding through the outer contacts of relay 27. Relay 10 in operating, completes an obvious circuit for slow-to-release relay 13.

The testing operator then dials the first digit, No. 3 for example, whereupon the circuit for relay 10 will be opened three times at contact 68 of dial 20 causing three deenergizations of said relay 10. At the first deenergization of relay 10, a circuit is completed for relay 14 and primary magnet 16 over a path extending from ground, through the lower normal contacts of relay 10, lower normal contacts of relay 11, lower alternate contacts of slow-to-release relay 13, contacts 17 of off-normal switch 22, winding of relay 14 and winding of primary magnet 16 to grounded battery. Relay 14 and magnet 16 operate in this circuit. Magnet 16 in operating moves the brushes 40, 41, 42 and 43 of the switch TD, one step in a primary direction. As soon as the brushes of the switch TD are moved off normal, the contacts 17 of the off-normal switch 22 are opened and the contacts 19 of the off-normal switch 22 are closed.

The off-normal contacts 65 are also closed at this time to prepare a circuit for release magnet 15. At the second and third deenergizations of relay 10, a circuit is completed for the primary magnet 16 over a path extending from ground, through the normal contacts of relay 10, lower normal contacts of relay 11, lower alternate contacts of relay 13, contacts 19 of off-normal switch 22, alternate contacts of relay 14, winding of relay 14 and winding of magnet 16 to grounded battery. Relay 14 being of the slow to release type does not retract its armature during the intervals between the impulses of a series. Due to the closures of the circuit of magnet 16, the brushes of the switch TD are advanced to the third group of terminals in the bank. After the cessation of the first series of impulses, relays 10 and 13 remain energized but relay 14 deenergizes due to the opening of the its circuit at the normal contacts of relay 10.

When the testing operator dials the next digit, for example No. 4, the relay 10 will be deenergized four times and transmit four impulses over a circuit which may be traced from ground, through the normal contacts of relay 10, lower normal contacts of relay 11, lower alternate contacts of relay 13, contacts 19 of off-normal switch 22, normal contacts of relay 14, and thence in parallel, one path extending through the left-hand contacts of relay 27, winding of relay 26 and winding of secondary magnet 25 to grounded battery, and the other path extending through the outer right-hand normal contacts of relay 28, normal contacts of magnet 15 and lower winding of relay 29 to grounded battery. The secondary magnet 25 will be operated four times over this circuit and will move the brushes of the switch TD in their secondary movement into engagement with the terminals leading to the selected test connector TC. Relay 26 is operated in the circuit traced for magnet 25 in response to the transmission of the first impulse to magnet 25. Relay 29, which is of the slow-to-release type, operates at the first deenergization of relay 10 and remains operated during the secondary movement of the brushes of switch TD so that relay 30 will not be connected across the brushes 40 and 41 at this time. Relay 26 is of the slow-to-release type and does not retract its armatures during the sending of a series of impulses. Relay 26 in operating, completes a circuit for relay 27 over a path extending from grounded battery, through the winding of relay 27, inner right-hand contacts of relay 26 and upper contacts of relay 13 to ground. Relay 27, in operating, locks over a path extending from grounded battery, through the winding and inner right-hand contacts of relay 27, and upper contacts of relay 13 to ground. Relay 27, in operating, opens at its outer right-hand contacts, the shunt circuit around relays 11 and 12, but since relay 26 operates before relay 27, a substitute shunt circuit is established around the windings of relays 11 and 12 through the outer right-hand contacts of relay 26. This shunt circuit is maintained as long as slow to release relay 26 remains energized. Relay 26 deenergizes shortly after the brushes 40 to 43 inclusive of switch TD have been moved in their secondary movement.

If the selected test connector TC is busy, ground will be present at the test terminal 47 and relay 28 will be operated before the slow to release relay 26 can retract its armatures. The circuit for operating relay 28 can be traced from grounded battery, through the winding of relay 28, intermediate right-hand contacts of relay 27, contact 69 of relay 26, brush 43 and thence to ground on terminal 47. The ground on terminal 47 may be steady, due to the previous selection of connector TC by another test distributor, or intermittent, due to transmission of impulses, thereover. In either of these cases, relay 28 operates. Relay 28 in operating, locks over a path extending from grounded battery, through the winding of relay 28, intermediate right-hand contacts of relay 27 and thence to ground at terminal 47 through contacts 69 of relay 26 as long as relay 26 is operated, and to ground through contacts 70 of relay 26, inner right-hand contacts of relay 28 and upper contacts of relay 13 to ground as soon as relay 26 retracts its armatures. Relay 28, in attracting its left-hand armature, opens the impulse circuit for the test connector so that a further actuation of the dial will not affect a previous connection to the test connector. Relay 28, in attracting its outer right-hand armature, completes a holding circuit for relay 29 through the normal contacts of magnet 15 and the lower winding of relay 29. Relay 29 completes a circuit for relay 30 over a path extending from grounded battery, through interrupter 31, inner alternate contacts of relay 29, lower normal contacts of key 35, winding of relay 30, upper normal contacts of key 35, outer alternate contacts of relay 29 to ground. Relay 30 is intermittently operated in this circuit and causes the flashing of lamp 32 over an obvious circuit as soon as the dial returns to normal and closes off-normal contact 66. The flashing of this lamp indicates to the operator that the selected test connector is busy.

If the selected test connector is idle, relay 26 releases as soon as the secondary impulses have been delivered but relay 28 will not be operated due to the absence of ground at the test terminal 47. Due to the release of relay 26, the short circuit is removed from relays 11 and 12 and said relay 11 operates in series with relay 10, over a circuit extending from ground, through the right-hand normal contacts of key 60, contacts of key 67, contacts 68 of dial 20, windings of relays 11, 12 and 10 and left-hand normal contacts of key 60 to grounded battery. Polarized relay 12 does not operate at this time since current flow is not in the proper direction. A circuit is then completed for relay 50 of the connector switch TC over a path extending from grounded battery, through the winding of relay 50, terminal 47, brush 43, contacts 72 of relay 26, left-hand contacts of relay 12 and upper 28, contacts of relay 12 and upper outer contacts of relay 11 to ground. Relay 50 operates in this circuit and completes an obvious circuit for slow to release relay 51.

When the testing operator dials the next digit, for example, No. 2, relay 11 functions to repeat the impulses to line relay 50 of the test connector TC. Each time the relay 11 deenergizes, the above traced circuit for relay 50 is opened. At the first deenergization of relay 50, a circuit may be traced from ground, through the normal contacts of relay 50, alternate contacts of relay 51, contacts 57 of off-normal switch 99, winding of relay 52 and winding of primary magnet 53 to grounded battery. Relay 52 which is preferably of the slow-to-release type operates in this circuit and magnet 53 also operates to move the brushes of the connector TC one step in a primary movement. As the brushes of the connector switch TC are moved off normal, contacts 57 are opened and contacts 58 are closed. In response to the succeeding impulse of the series, relay 50 deenergizes a corresponding number of times thereby transmitting impulses to magnet 53 over a path extending from ground through the normal contacts of relay 50, alternate contacts of relay 51, contacts 58 of off-normal switch 99, alternate contacts and winding of relay 52 and winding of magnet 53 to grounded battery. In response to these impulses magnet 53 operates to move the brushes of the connector switch TC a number of steps corresponding to the impulses transmitted. After the cessation of the impulses for moving the connector switch TC in a primary direction, relays 11, 50 and 51 remain energized but relay 52 releases. Relay 52 releases due to the opening of its circuit at the normal contacts of relay 50, When the testing operator dials the next digit, No. 5, for example, the relay 11 will momentarily deenergize five times and will send five impulses of current to the relay 50 which in turn will transmit five impulses of current to the secondary magnet 55 over a path extending from ground through the normal contacts of relay 50, alternate contacts of relay 51, contacts 58 of the off-normal switch 99, normal contacts of relay 52 and winding of magnet 55 to grounded battery. The secondary magnet 55 will be operated over this circuit and will move the brushes 74, 75 and 76 of the connector switch TC into engagement with the terminals of the line corresponding to the number of impulses transmitted.

During the transmission of the impulses, for setting the test connector, relay 10 is intermittently deenergized. At the first interruption of the circuit of relay 10 in response to the transmission of the impulses for moving the connector switch TC in its primary movement, relay 29 is operated over a circuit extending from grounded battery, through the lower winding of relay 29, normal contacts of magnet 15, outer right-hand normal contacts of relay 28, normal contacts of relay 14, contacts 19 of off-normal switch 22, lower alternate contacts of relay 13, lower normal contacts of relay 11 and normal contacts of relay 10 to ground. The same circuit is completed for relay 29 during the secondary movement of switch TC. Relay 29 operates in this circuit and being of the slow-to-release type, remains operated during the transmission of the remaining impulses of a series. Relay 29 in operating disconnects the talking conductors of the connector from the test desk during the time that the brushes of the connector TC are moving over its associated contacts.

If the line selected is busy, ground will be present upon its test terminal 96 in the connector switch TC due to a ground connection applied to one of its multiples by a regular connector, and relay 29 will remain operated, when dialing ceases, over a path extending from ground at terminal 96, through brush 76, terminal 46, brush 42, upper normal contacts of relay 98 and upper winding of relay 29 to grounded battery. When the dial returns to normal and contact 66 closes after the last digit has been dialed, lamp 32 will be flashed due to the intermittent operation of relay 30 over the path previously traced. The flashing of this signal indicates to the testing operator that the selected line is busy.

If the testing operator desires to connect to the called line in its busy condition, he will open key contacts 67 thereby opening the short circuit extending through contacts 67 around the high resistance 62. The insertion of the high resistance 62 in series with relays 11 and 10 causes the release of relay 10. Relay 11 remains operated however. Relay 10, in releasing, completes a circuit for relay 98 over a path extending from ground, through the normal contacts of relay 10, lower alternate contacts of relay 11 and winding of relay 98 to grounded battery. Relay 98, in operating, opens the energizing circuit for relay 29 extending to ground at the test terminal 96. The testing operator may then actuate key 35 thereby extending the test circuit 90, 91 through the upper and lower alternate contacts of key 35 to the selected line.

If the selected line is idle, relay 29 will release as soon as the operator completes dialing. Relay 30 will then be operated over a path extending from ground, through the left-hand winding of the line relay 97 of the called station, terminal 94, brush 74, terminal 44, brush 40, upper normal contacts of relay 29, conductor 84, upper normal contacts of key 35, winding of relay 30, lower normal contacts of key 35, conductor 85, inner normal contacts of relay 29, brush 41, terminal 45, brush 75, terminal 95 and right-hand winding of relay 97 to grounded battery. If the selected line is in a normal condition, relay 30, will operate, causing lamp 32 to glow steadily over the circuit previously traced. Relay 97 does not operate at this time due to the high resistance of relay 30 in series with it. If, however, the selected line is not in a normal condition, relay 30 will not be operated and lamp 32 will not light.

If the tester so desires he can advance the test connector across the selected level, one step at a time, by simply dialing to send impulses sufficient to step the brushes to the wanted line, for example, if after having established a connection with the station D, whose number has been assumed to be 3425, the testing operator desires to establish a connection with the subscriber whose number is 3427, he will simply dial the digit 2 which will advance the test connector TC two steps in a secondary movement thereby establishing connection with the subscriber in the station whose number is 3427.

If the test operator desires to test a line which is reached by the same test connector but in a different group, he may release the test connector without releasing the test distributor by operating the reverse battery key 60 which will cause the polarized relay 12 to operate to effect the release of the test connector. Actuation of key 60 causes the current to flow through polarized relay 12 in the reverse direction whereupon relay 12 attracts its armature thereby opening the circuit for relay 50 of the test connector TC. Relay 50, in releasing, releases relay 51 thereby completing a circuit for release magnet 54 of the test connector TC over a path extending from ground through the normal contacts of relay 50, normal contacts of relay 51, off-normal contacts 56 and winding of magnet 54 to grounded battery. Magnet 54 operates in this circuit and causes the restoration of the switch TC to normal in the manner well known in the art. The testing operator may now restore key 60 to normal and then dial the two digits necessary to step the connector on to the desired line. The operation of the connector is, in this instance, similar to that previously described.

After the testing operator has completed the tests he may open contacts 80 to 83, inclusive. The opening of contacts 82 and 83 causes the release of relays 11 and 10. Relay 11, in releasing, opens the circuit for the slow-to-release relay 13 of the switch TD and relay 50 of the test connector TC. Relay 50 in releasing causes the release of relay 51 and the operation of release magnet 54. Magnet 54, in operating, restores the connector switch TC to normal. The release of relays 10, 11 and 13 completes a circuit for the release magnet 15 of the test distributor over a path extending from ground, through the normal contacts of relay 10, lower normal contacts of relay 11, lower normal contacts of relay 13, off-normal contacts 65, and winding of release magnet 15 to grounded battery. Magnet 15 operates in this circuit and causes the restoration of test distributor switch TD to normal in the manner well known in the art. The circuits are now in condition for use again.

The testing equipment of the operator's position connected to conductors 90, 91, is not shown since it forms no part of this invention. It may be of the type shown and described in Smith and Campbell's book entitled "Automatic Telephony", (second edition) pp. 367 to 373.

What is claimed is:

1. In a testing system, a switch, a set of terminals therein, means for positioning the switch brushes on said terminals whether idle or busy, another switch reached by the switch first mentioned via said terminals, a test circuit including one of said brushes and one of said terminals, and an impulse circuit including said brush and terminal for setting the secondly mentioned switch.

2. In a testing system, a plurality of test distributors, a plurality of test connectors terminating in fixed sets of terminals in said test distributors, means for positioning the brushes of a test distributor on the fixed set of terminals leading to a given test connector, a test circuit including one of said brushes and one of said terminals, a circuit for guarding said connector including said brush and terminal, and an impulse circuit for setting said selected connector also including said brush and terminal.

3. In a testing system, a plurality of test distributors, a plurality of test connectors terminating in fixed sets of terminals in said test distributors, means for positioning the brushes of a test distributor on the fixed set of terminals leading to a given test connector, a test circuit including one of said brushes and one of said terminals, a circuit for guarding said connector including said brush and terminal, an impulse circuit for setting said selected connector, and a release circuit for said connector including said brush and terminal.

4. In a testing system, a plurality of test distributors, a plurality of test connectors terminating in fixed sets of terminals in said test distributors, means for positioning the brushes of a test distributor on the fixed set of terminals leading to a given test connector, a test circuit including one of said brushes and one of said terminals, a circuit for guarding said connector including said brush and terminal, an impulse circuit for setting said connector, a release circuit for said connector including said brush and terminal, manually controlled means for opening said circuit to release said connector, a release circuit for said distributor, and manually controlled means for closing the release circuits of both the distributor and connector.

5. In a testing system, a first switch, a second switch, means for setting the first switch on a set of terminals leading to the second switch whether idle or busy, means at the first switch for testing the second switch, means for transmitting impulses to the second switch, and a common conductor over which said testing means is actuated and said impulses are transmitted.

6. In a testing system, a first switch having a plurality of brushes, a second switch, testing devices at said first switch, impulse repeating means at said first switch, means for setting the brushes of said first switch on the terminals leading to said second switch whether idle or busy, and a circuit comprising one brush of said first switch for connecting said testing devices and said impulse repeating means in operative relationship with said second switch.

7. In a testing system, a subscriber's line, an impulse sender, a first switch having a plurality of movable contacts, a second switch, means controlled by said sender for connecting said first switch to said second switch whether idle or busy, a repeating relay at said first switch for controlling the setting of said second switch, a test circuit including one of the movable contacts of said first switch for testing said second switch for a busy or idle condition, and means operative if the second switch is idle for connecting the repeating relay in operative relationship with the second switch over the movable contact included in the test circuit.

8. In a testing system, a subscriber's line, a first switch comprising a pair of talking conductors and a pair of non-talking conductors, a second switch, testing devices at said first switch, impulses repeating means at said first switch, a circuit including one of the non-talking conductors of said first switch for connecting one of said testing devices and said impulse repeating means in operative relationship with said second switch, and a circuit including the other of said non-talking conductors of said selector switch for placing said other testing devices in operative relationship with said subscriber's line.

9. In a testing system, an operator's position, a subscriber's line, a train of automatic switches, a circuit extending between said position and said switches, means for setting said switches in sequence over said circuit whereby said position is linked to said line, means for indicating to the operator that the line is busy, and means at the first switch of the train actuated over the said circuit in response to a control exercised by the operator upon receiving the busy signal for enabling her to establish a connection with the line when it is busy.

In witness whereof, I hereunto subscribe my name this 15th day of December A. D., 1922.

RAY L. STOKELY.